2 Sheets—Sheet 1.
P. ANDREW.
LARD-RENDERING TANK.
No. 171,756. Patented Jan. 4, 1876.
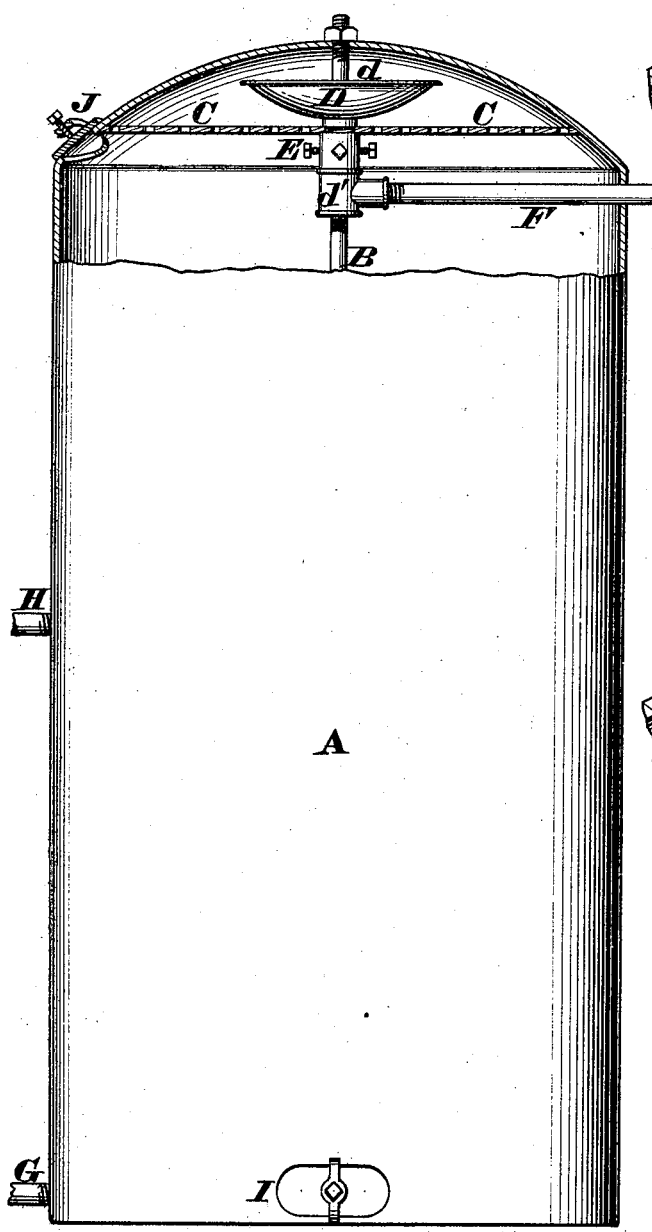
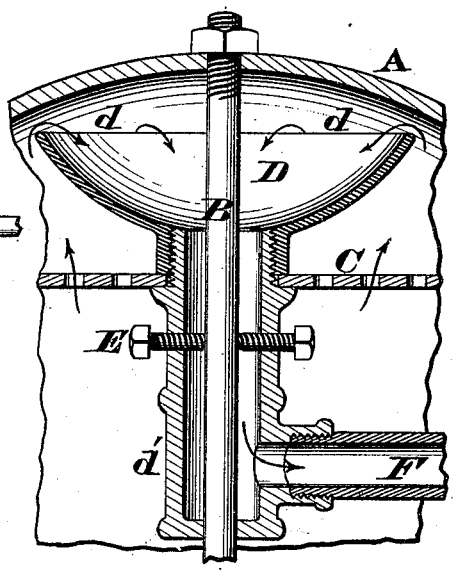
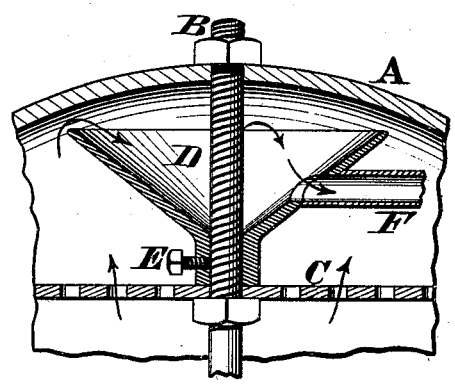
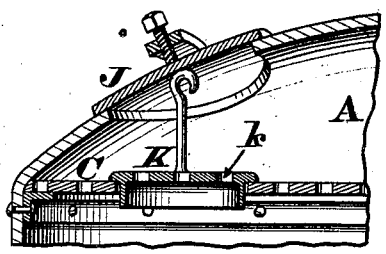
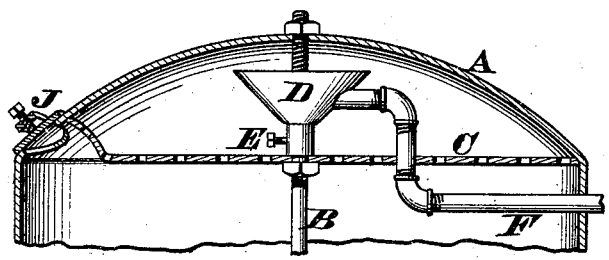
N. PETERS, PHOTO-LITHOGRAPHER, WASHINGTON, D.C.

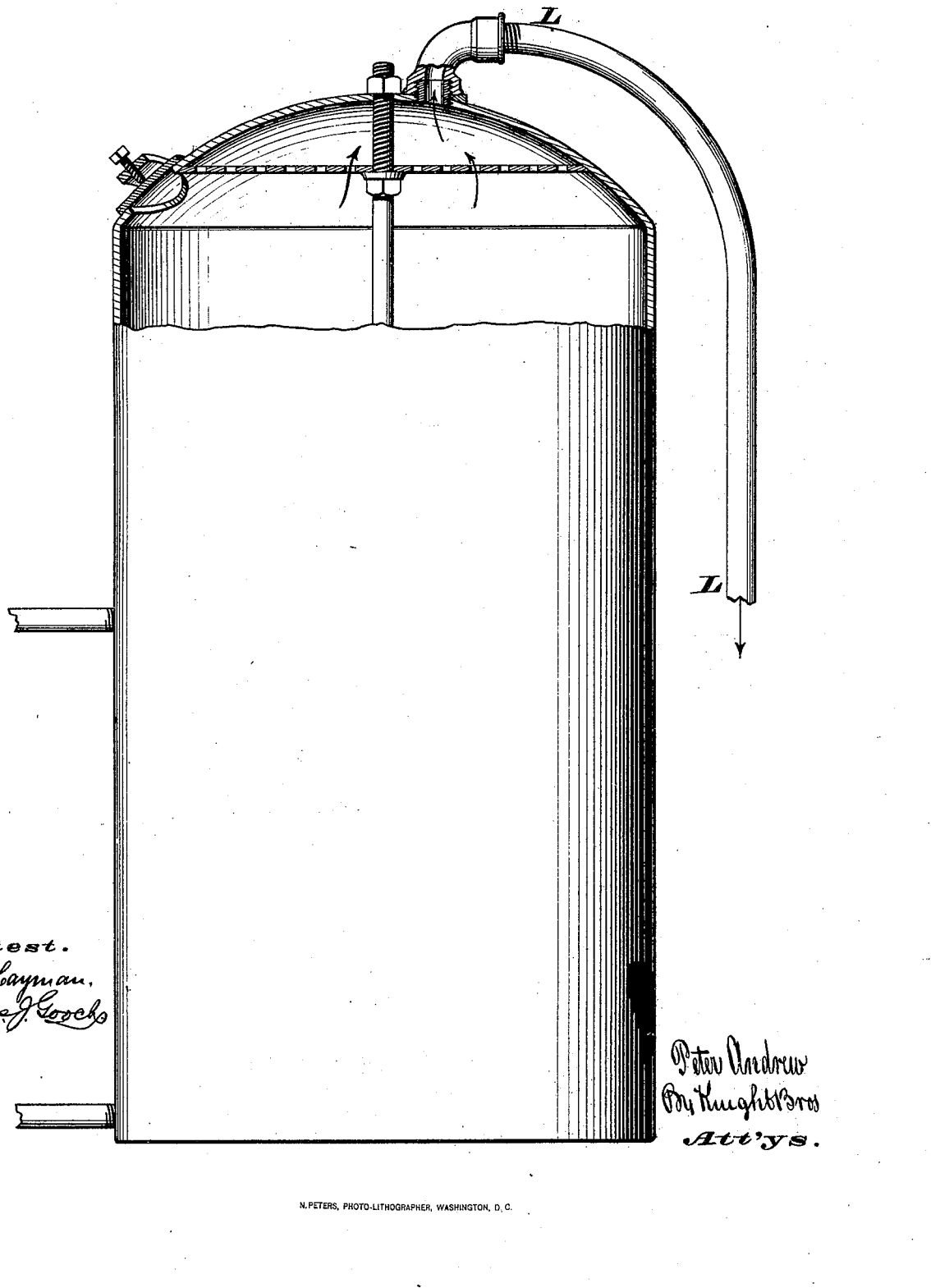

UNITED STATES PATENT OFFICE.

PETER ANDREW, OF CINCINNATI, OHIO.

IMPROVEMENT IN LARD-RENDERING TANKS.

Specification forming part of Letters Patent No. 171,756, dated January 4, 1876; application filed October 6, 1875.

*To all whom it may concern:*

Be it known that I, PETER ANDREW, of Cincinnati, Hamilton county, Ohio, have invented a new and useful Apparatus for Separating Fat from Refuse within a Steam Rendering-Tank, of which the following is a specification:

The object of this invention is to separate, within the tank, the rendered fat from the refuse that floats upon the water, which refuse is a little heavier than the rendered fat.

In the rendering apparatus in common use it is found that, after the lard or tallow has been withdrawn from the tank as completely as possible, there is still a residue mixed with the refuse which floats upon the water.

The present method of separation is, after the lard has been withdrawn from the tank, to discharge, through a gate or man-hole at the bottom of the tank, what remains in it into what is termed a slush-tub. The lard and other light matter rises to the surface of the water, and, by the use of a tin skimmer, a portion of the lard (of inferior quality) is saved.

The advantages claimed for my present invention are, the saving of all the rendered fat without deterioration in quality of any part of it, with less labor, and in a much shorter time, than it can be done by the customary method.

In the accompanying drawing, Figure 1 represents, partly by elevation and partly by axial sections, a rendering-tank embodying my improvements. Fig. 2 is an enlarged section through the operative parts of the device. Figs. 3, 4, 5, and 6 represent modifications of my improvement.

A may represent a common cylindrical steam rendering-tank, having the customary stay-rod B. Extending horizontally athwart the tank, near its top, is a perforated floor or strainer, C, whose office is to separate the rendered fat from the surface of the water with its floating refuse. D is a funnel, called by me the "skimmer," whose cup-formed or flaring mouth $d$ is adjusted to the horizontal position by means of set-screws E, which, traversing the neck of the funnel, bear against the stay-rod.

The mouth $d$ is situated at such height above the separator as to capacitate it to receive the fat which is floated upward through the latter upon the surface of the water. A pipe, F, from the neck $d'$ of the skimmer, and passing out through the sides of the tank, serves to conduct off the fat that flows into the skimmer. G and H represent the usual steam-pipe and water-pipe; and I and J represent the customary man-holes.

The operation is as follows: Rendering having been completed, water is let into the tank below the rendered fat, causing it to rise and flow into the skimmer, and thence out of the tank, the flow of water being continued until the fat is entirely removed from the tank.

The above-described preferred form of my invention is susceptible of various modifications. For example: Fig. 3 represents a modification of my improvement, in which the fat-spout is conducted off above the separator. Fig. 4 shows the same spout let down through the separator, and thence out through the tank-side. Fig. 5 shows a form of my improvement, in which the man-hole, being located above the separator, is accompanied by another man-hole, K, in the separator, the cap $k$ of this inner man-hole being perforated, as shown. Fig. 6 shows a form in which the skimmer is dispensed with, and in which the separated fat escapes through a spout, L, that communicates with the top of the tank.

The strainer may be of wire-cloth, or any other suitable pervious material.

I claim as new and of my invention—

The described combination, in a steam rendering-tank, of the perforated strainer C, skimmer D, hot-water pipe G, and cold-water pipe H, all substantially as and for the purpose described.

In testimony of which invention I hereunto set my hand.

PETER ANDREW.

Attest:
GEO. H. KNIGHT,
JAMES H. LAYMAN.